United States Patent

Takagi et al.

[11] Patent Number: 5,926,633
[45] Date of Patent: *Jul. 20, 1999

[54] METHOD AND APPARATUS FOR SELECTIVE CONTROL OF DATA TRANSFER BETWEEN SYSTEMS HAVING A SHARED MEMORY

[75] Inventors: Tsuneyoshi Takagi, Yokohama; Yuichi Bannai, Koganei; Hiroaki Sato, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/398,291

[22] Filed: Mar. 3, 1995

[30] Foreign Application Priority Data

Mar. 3, 1994 [JP] Japan .................................. 6-034557
Jul. 29, 1994 [JP] Japan .................................. 6-177919

[51] Int. Cl.⁶ .............................. G06F 3/14; G06F 13/00
[52] U.S. Cl. ........................... 395/566; 395/569; 364/134
[58] Field of Search .................................. 395/425, 560, 395/100, 561, 566, 680, 11, 569; 364/200, 130, 134, 228, 228.1, 230.5, 238.3, 238.4, 474.11

[56] References Cited

U.S. PATENT DOCUMENTS 4,414,624 11/1983 Summer, Jr. et al. ............. 395/800.21
5,157,763 10/1992 Peters et al. .............................. 345/340
5,204,936 4/1993 Kaneko et al. ............................. 395/11
5,301,268 4/1994 Takeda ..................................... 395/680
5,487,141 1/1996 Cain et al. .............................. 345/435

FOREIGN PATENT DOCUMENTS 475600 8/1991 European Pat. Off. .......... G06F 9/46

OTHER PUBLICATIONS

IBM Technical Disclosure Bulletin, vol. 37, No. 3, Mar. 1994 New York US, pp. 325–326, XP 000441490 'Cascade Clipboards: Accessing Multiple Clipboards'.
Asael Dror & Robert Lafore: 'OS/2 Presentation Manager Programming Primer', 1990, Osborne McGraw–Hill, Berkeley, USA, pp. 550–573.

Primary Examiner—Krisna Lim
Attorney, Agent, or Firm—Fitzpatrick, Cella, Harper & Scinto

[57] ABSTRACT

When an object region of data has been assigned through an input unit, an object assigning unit writes the assigned object in a picture surface information region in an assigned object information region. When a cutting command has been input, the assigned region is stored in a nonshared clipboard region or a shared clipboard region according to instruction by the command. A shared clipboard is connected to shared clipboards of other systems via a shared clipboard communication unit. When a position has been assigned and a pasting command has been input, a pasting processing unit takes out data from an assigned clipboard, and connects the data to the assigned position. Thus, an operation of cutting and pasting data between systems is simplified.

19 Claims, 13 Drawing Sheets

METHOD AND APPARATUS FOR SELECTIVE CONTROL OF DATA TRANSFER BETWEEN SYSTEMS HAVING A SHARED MEMORY

BACKGROUND OF THE INVENTION

1. Field of the Invention

This invention relates to a data processing method and a system using the method for sharing data when, for example, a plurality of users perform editing operations.

2. Description of the Related Art

Conventionally, when a plurality of computer systems are connected through a network or the like, and one of the systems intends to use data locally held by another system, for example, in an operation of pasting data cut in the other system to data of the one system, the cut data is first pasted to data shared by all the systems. Thereafter, the necessary data is cut again from the shared data, and the cut data is pasted to the data to which the the cut data is to be pasted.

FIGS. 5(a) and 5(b) illustrate such a cut-and-paste operation in the prior art. In this operation, an object on a personal window 5a-1 of system A is cut and is then pasted onto a personal window 5b-1 of system B. First, the object cut in system A is pasted onto a shared window 5a-3 of system A. The object also appears on a shared window 5b-3 of system B. The object on the shared window 5b-3 is cut in system B, and the cut object is pasted onto the personal window 5b-1 of system B. Thus, the object on the personal window 5a-1 of system A is pasted onto the personal window 5b-1 of system B.

When a plurality of systems perform editing operations while sharing data (for example, in the case of groupware), a request of a system to use data cut by another system during an editing operation without modification often exists. In the above-described conventional approach, however, since data cut by the other system is not written in a cutting buffer of the one system, the data pasted to a region shared by all the systems by the other system must be cut again. Furthermore, for example, in the case of graphic data or image data, it is difficult to cut data pasted by the other system in entirely the same shape.

SUMMARY OF THE INVENTION

The present invention has been made in consideration of the above-described problems.

It is an object of the present invention to simplify processes in an editing operation by providing a buffer which can be referred to from a plurality of systems.

It is another object of the present invention to provide a data processing method and a system using the method in which by performing control of registering or reading information, which is assigned to be cut or pasted, as clipped information locally held by a system or shared clipped information shared by systems by determining a kind of storage or reading of the information, the information assigned to be cut or pasted can be efficiently registered or read as the shared clipped information locally held by the system or clipped information shared by the systems with a small number of operation instructions.

According to one aspect, the present invention, which achieves these objectives, relates to a data processing method in which data is shared by a shared memory in a plurality of systems each including a local memory, comprising the steps of assigning a desired data region in a desired system from among the plurality of systems, assigning a location to store the data region assigned in the region assigning step, storing data of the region assigned in the region assigning step in the shared memory or the local memory of the system based on the assignment in the storage location assigning step, assigning the location of data to be connected to the desired data in the desired system, and connecting the data stored in the shared memory or the local memory to the assigned data based on the assignment in the connected data assigning step.

According to another aspect, the present invention relates to a data processing method in which data is shared by a shared memory in a plurality of systems each including a local memory, comprising the steps of assigning a desired region from data displayed on a picture surface, assigning to store the region assigned in the region assigning step in one of the local memory and the shared memory and storing the assigned region in the assigned memory, assigning a desired position in data displayed on a picture surface, and assigning one of the local memory and the shared memory and copying the data stored in the storing step from the assigned memory to the position assigned in the position assigning step.

According to still another aspect, the present invention relates to a data processing method for data processing systems including first storage means for storing clipped information, locally held by each system, to be cut on a window displayed on a picture surface of display means, and second storage means for storing shared clipped information, shared by the systems, to be cut from the window displayed on the picture surface of the display means, comprising the steps of assigning the region of information to be cut from a window, assigning a cutting or pasting operation of the information to be cut on the window as shared clipped information, determining the state of the cutting instruction in the instructing step, and storing the information assigned to be cut in the assigning step in the first storage means or the second storage means as clipped information or shared clipped information, respectively, based on the result of the determination in the determining step.

According to still another aspect, the present invention relates to a data processing method for data processing systems including first storage means for storing clipped information, locally held by each system, to be cut on a window displayed on a picture surface of display means, and second storage means for storing shared clipped information, shared by the systems, to be cut from the window displayed on the picture surface of the display means, comprising the steps of assigning the position of information where data is to be pasted on a window, instructing to paste one of the clipped information and the shared clipped information stored in the first storage means and the second storage means, respectively, determining the state of the pasting assignment by the instructing step, and selecting and reading one of the clipped information and the shared clipped information from the first storage means and the second storage means, respectively, to the position within the window assigned by the assigning step based on the result of the determination in the determining step.

According to still another aspect, the present invention relates to a data processing method for data processing systems including first storage means for storing clipped information, locally held by each system, to be cut on a window displayed on a picture surface of display means, and second storage means for storing shared clipped information, shared by the systems, to be cut from the window displayed on the picture surface of the display means, comprising the steps of assigning the region of information to be cut from a window, storing the information assigned to be cut in the assigning step in the first storage means as clipped information, instructing to move the information cut on the window to a shared clipped window, and storing the information stored in the first storage means as the clipped information in the moving instructing step in the second storage means as shared clipped information.

According to still another aspect, the present invention relates to a data processing method for data processing systems including first storage means for storing clipped information, locally held by each system, to be cut on a window displayed on a picture surface of display means, and second storage means for storing shared clipped information, shared by the systems, to be cut from the window displayed on the picture surface of the display means, comprising the steps of assigning the position of information where data is to be pasted on a window, moving the information to be pasted on the window from a shared clipped window, and reading the shared clipped information stored in the second storage means to the position of the window of the display means assigned to paste the data in the moving step.

According to still another aspect, the present invention relates to a data processing system in which data is shared by a shared memory in a plurality of data processing apparatuses each including a local memory, comprising region assigning means for assigning a desired data region in a desired data processing apparatus from among the plurality of data processing apparatuses, storage location assigning means for assigning a location to store the data region assigned by the region assigning means, storage means for storing data of the region assigned by the region assigning means in the shared memory or the local memory of the apparatus based on the assignment by the storage location assigning means, connected location assigning means for assigning the location of data to be connected to the desired data in the desired data processing apparatus, and connection means for connecting the data stored in the shared memory or the local memory to the assigned data based on the assignment by the connected data assigning means.

According to still another aspect, the present invention relates to a data processing system in which data is shared by a shared memory in a plurality of apparatuses each including a local memory, comprising region assigning means for assigning a desired region from data displayed on a picture surface, storage means for assigning to store the region assigned by the region assigning means in one of the local memory and the shared memory and for storing the assigned region in the assigned memory, position assigning means for assigning a desired position in data displayed on the picture surface, and copying means for assigning one of the local memory and the shared memory and for copying the data stored by the storage means from the assigned memory to the position assigned by the position assigning means.

According to still another aspect, the present invention relates to a data processing system in which a plurality of apparatuses perform operations by sharing data, comprising a position buffer for storing positional information relating to a portion to be cut, an internal buffer for referring to the cut information within each of the apparatuses, a shared buffer for referring to the cut information while being shared by other systems, means for specifying the cut portion and storing the positional information thereof in the position buffer, means for referring to the shared buffer between different systems, switching means for switching between the internal buffer and the shared buffer, means for storing the positional data stored in the position buffer by selecting one of the internal buffer and the shared buffer switched by the switching means, and reading means for selecting the one of the internal buffer and the shared buffer switched by the switching means and reading data of the contents of the selected buffer.

According to still another aspect, the present invention relates to a data processing system including first storage means for storing clipped information, locally held by a system, to be cut on a window displayed on a picture surface of display means, and second storage means for storing shared clipped information, shared by systems, to be cut from the window displayed on the picture surface of the display means, comprising assigning means for assigning the region of information to be cut from a window, instruction means for instructing whether the information to be cut on the window must be cut as clipped information or the shared clipped information, determination means for determining the state of the cutting instruction by the instruction means, and cutting control means for storing the information assigned to be cut assigned by the assigning means in the first storage means or the second storage means as clipped information or shared clipped information, respectively, based on the result of the determination by the determination means.

According to still another aspect, the present invention relates to a data processing system including first storage means for storing clipped information, locally held by a system, to be cut on a window displayed on a picture surface of display means, and second storage means for storing shared clipped information, shared by systems, to be cut from the window displayed on the picture surface of the display means, comprising assigning means for assigning the position of information to be pasted on a window, instruction means for instructing which one of the clipped information and the shared clipped information stored in the first storage means and the second storage means, respectively, is to be pasted, determination means for determining the state of the pasting instruction by the instruction means, and pasting control means for reading one of the clipped information and the shared clipped information from the first storage means and the second storage means, respectively, to the assigned position within the window assigned by the assigning means based on the result of the determination by the determination means.

According to still another aspect, the present invention relates to a data processing system including first storage means for storing clipped information, locally held by a system, to be cut on a window displayed on a picture surface of display means, and second storage means for storing shared clipped information, shared by systems, to be cut from the window displayed on the picture surface of the display means, comprising assigning means for assigning the region of information to be cut from a window, cutting control means for storing the information of the region assigned by the assigning means in the first storage means as clipped information, and determination means for determining if the information to be cut on the window must be cut as shared clipped information. The cutting control means stores again the clipped information stored in the first storage means in the second storage means as shared clipped information based on the result of the determination of the determination means.

According to still another aspect, the present invention relates to a data processing system including first storage means for storing clipped information, locally held by a system, to be cut on a window displayed on a picture surface of display means, and second storage means for storing shared clipped information, shared by systems, to be cut from the window displayed on the picture surface of the display means, comprising assigning means for assigning the position of information to be pasted on a window, determination means for determining if the information to be pasted on the window must be pasted as shared clipped information, and pasting control means for reading the clipped information or the shared clipped information stored in the first storage means or the second storage means, respectively, to the position of the window of the display means, where the information is to be pasted, based on the result of the determination of the determination means.

The foregoing and other objects, advantages and features of the present invention will become more apparent from the following description of the preferred embodiments taken in conjunction with the accompanying drawings.

DESCRIPTION OF THE PREFERRED EMBODIMENTS

Figure 1:
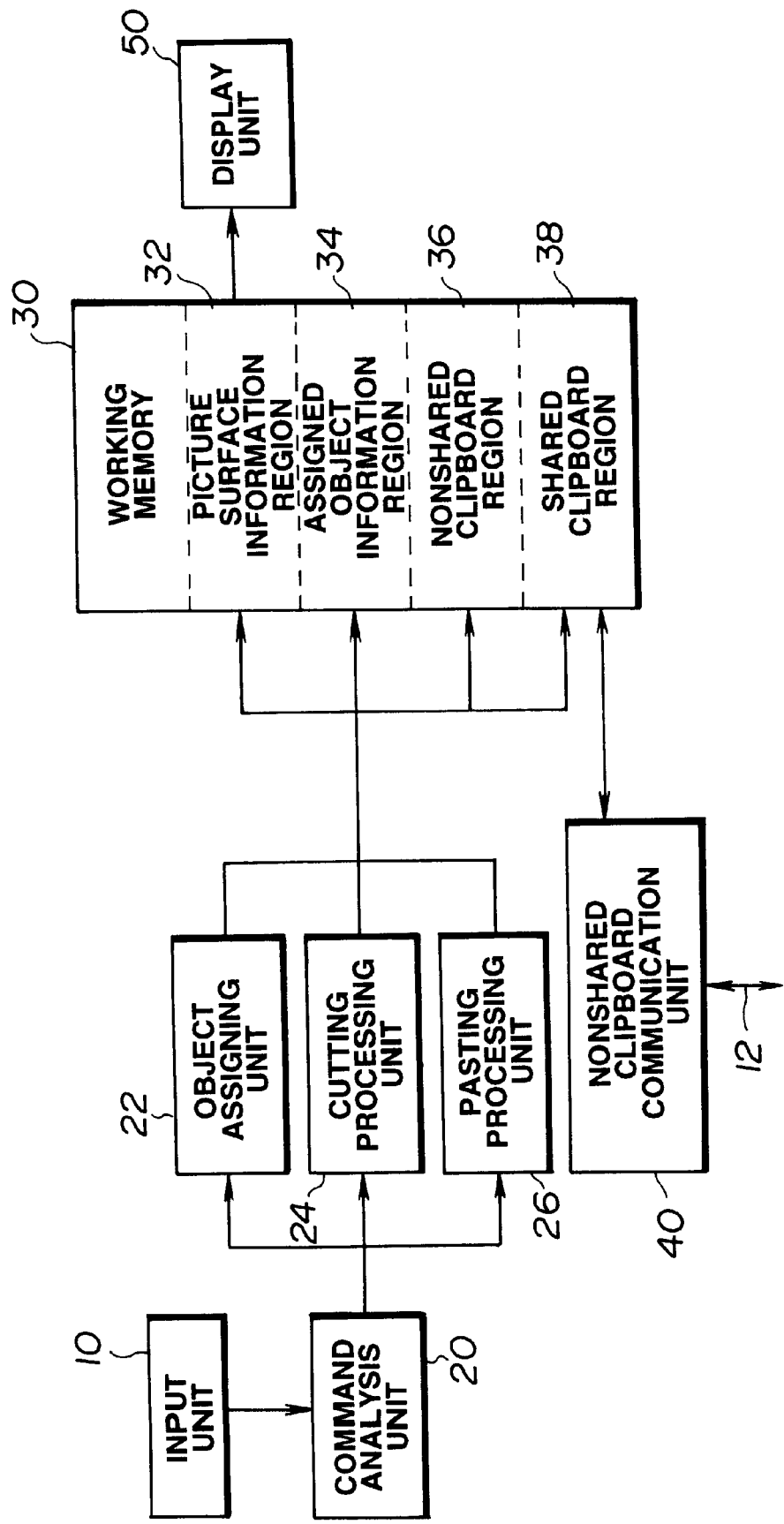
FIG. 1 is a block diagram illustrating the configuration of a data processing system according to a first embodiment of the present invention.

FIG. 1 is a block diagram illustrating a data processing system according to a first embodiment of the present invention. This system very well represents characteristics of the present invention. In FIG. 1, an input unit 10 comprises a keyboard for inputting commands, a pointing device (mouse) for performing operations on a picture surface, and the like. A command analysis unit 20 analyzes a command and transmits controls of corresponding processing to respective control units. An object assigning unit 22 assigns an object to be cut or pasted. A cutting processing unit 24 performs cutting processing of data. A pasting processing unit 26 performs pasting processing of data. A working memory 30 is used by the user. A picture surface information region 32 in the working memory 30 stores information to be output to the picture surface of a display unit 50. An assigned object information region 34 in the working memory 30 stores information relating to the assigned object. A nonshared clipboard region 36 in the working memory 30 stores information relating to a clipboard locally used by each system. A shared clipboard region 38 in the working memory 30 stores information relating to a shared clipboard which can be commonly used by respective systems. Each of the working memory 30, the picture surface information region 32, the nonshared clipboard region 36, the shared clipboard region 38 comprises a storage medium, such as a RAM (random access memory) or the like, whose size and addresses are controlled by a system program (not shown). A shared clipboard communication unit 40 exchanges information of the shared clipboard with other systems. The information of the shared clipboard is transmitted to other systems by communication via a network. Reference numeral 12 represents a communication network for communicating with shared clipboard communication units of other systems.

Figure 7:
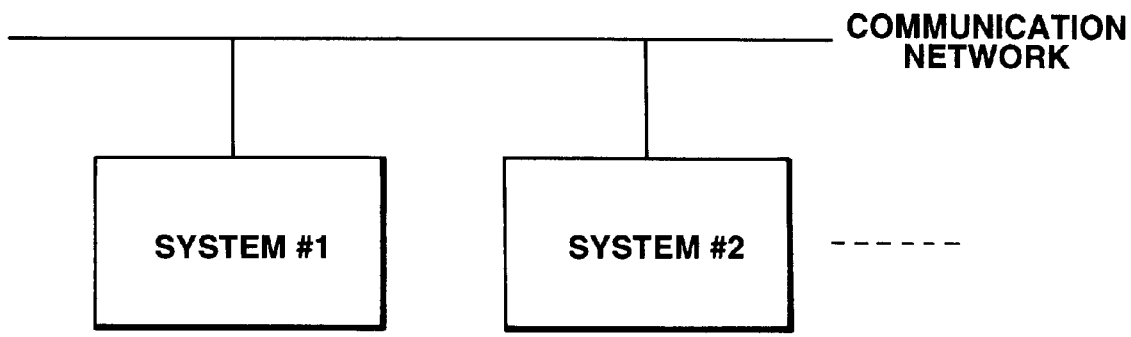
FIG. 7 is a diagram illustrating the configuration of systems in the first embodiment.

Systems, each having the configuration shown in FIG. 1, are connected as shown in FIG. 7 via a communication network.

As described above, the data processing system includes the nonshared clipboard region 36 for locally referring to cut information used when cutting and pasting an object on a picture surface using the input unit 10, comprising the keyboard, the mouse and the like, and the shared clipboard region 38 for referring to cut information while sharing it with other systems. In an editing operation while a plurality of systems share data, when performing cut-and-paste processing via a clipboard for a common operation, serving as means for exchanging the contents of the shared clipboard region 38 with other systems, the use of the shared clipboard region 38 and the use of the nonshared clipboard region 36 in a cutting operation and a pasting operation is controlled by programs.

Figure 2:
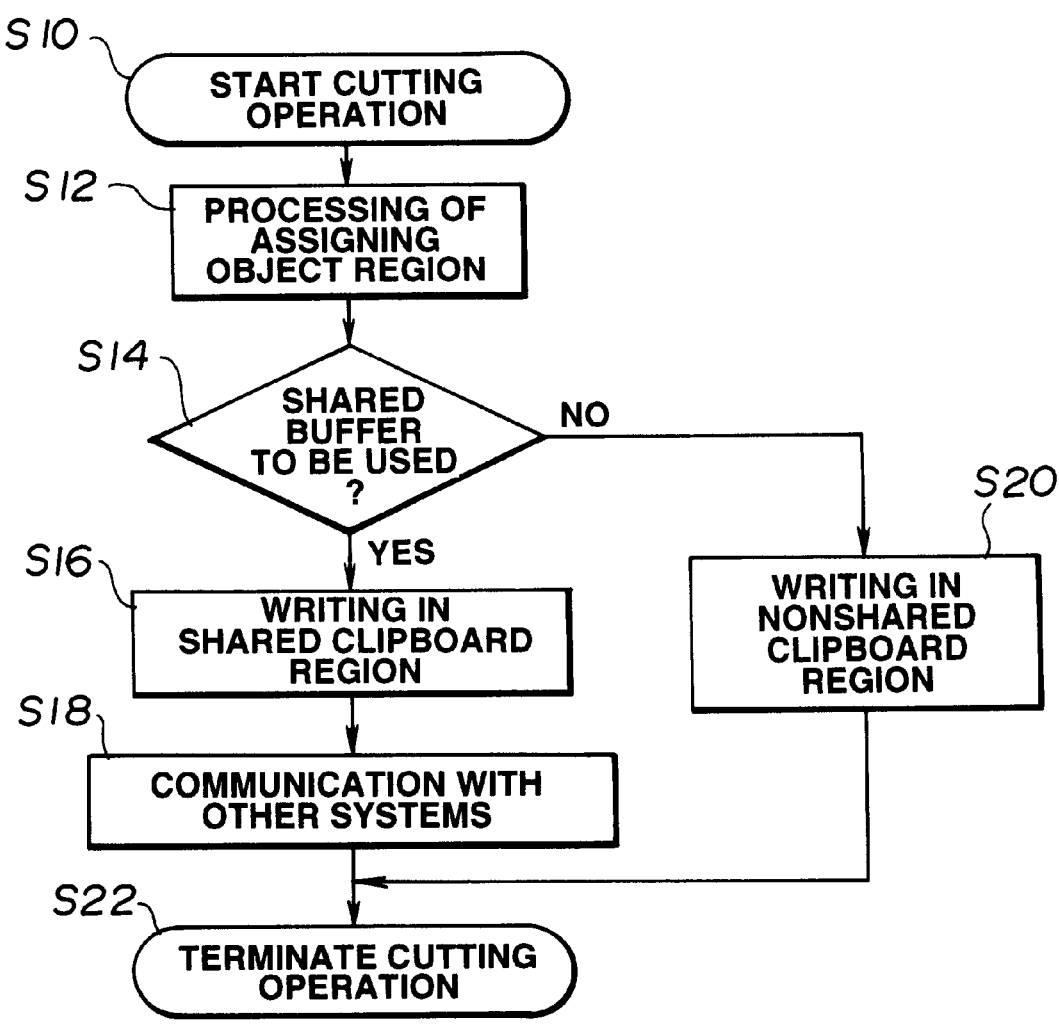
FIG. 2 is a flowchart illustrating a cutting operation in the system of the first embodiment.

FIG. 2 is a flowchart illustrating procedures of a cutting operation in the above-described system. First, procedures of a cutting operation will be described with reference to FIGS. 1 and 2.

(1) Assignment of an object to be cut (process of assigning an object region (steps S10 and S12))

When an object-assigning command for assigning an object to be cut has been input from the input unit 10 by region assignment using the mouse or position assignment through the keyboard, the command analysis unit 20 transmits positional information of the assigned object to the object assigning unit 22. The object assigning unit 22 then writes information relating to the assigned object in the assigned object information region 34 in the working memory 30. Region assignment is usually performed by assigning a desired region on the picture surface displayed on the display unit 50.

(2) Writing of the object region in the nonshared clipboard region 36 (process of determining if a shared buffer must be used (step S14), and writing processing in the nonshared clipboard region 36 (step S20))

In the case of assigning a cutting operation using the nonshared clipboard by clipping or selection of a menu by the mouse, or by input of a command through the keyboard, when a cutting operation command has been input from the input unit 10, the command analysis unit 20 causes the cutting processing unit 24 to perform control. The cutting processing unit 24 then extracts the assigned object from the picture surface information region 32 based on the information stored in the assigned object information region 34, and writes the extracted data in the nonshared clipboard region 36.

(3) Writing of the object in the shared clipboard region 38 (process of determining if the shared buffer must be used (step S14), and writing processing in the shared clipboard region 38 (step S16))

In the case of assigning a cutting operation using the shared clipboard 38 by clipping or selection of a menu by the mouse, or by input of a command through the keyboard, when a cutting operation command has been input, the command analysis unit 20 causes the cutting processing unit 24 to perform control. The cutting processing unit 24 then extracts the assigned object from the picture surface information region 32 based on the information stored in the assigned object information region 34, and writes the extracted data in the shared clipboard region 38.

The operation of writing the object in the shared clipboard region 38 is basically the same as the operation of writing the object in the nonshared clipboard region 36, but care must be taken so as not to make the operation of writing the object in the shared clipboard region 38 more complicated than the operation of writing the object in the nonshared clipboard region 36. For example, in a clipping operation using the mouse, the object region to be cut is written in the nonshared clipboard region 36 when a clipping operation is performed without doing any additional operation, and is written in the shared clipboard region 38 when a clipping operation is performed while depressing a control key (shift key, not shown). Thereupon the cutting operation is terminated (step 22).

Figure 9:
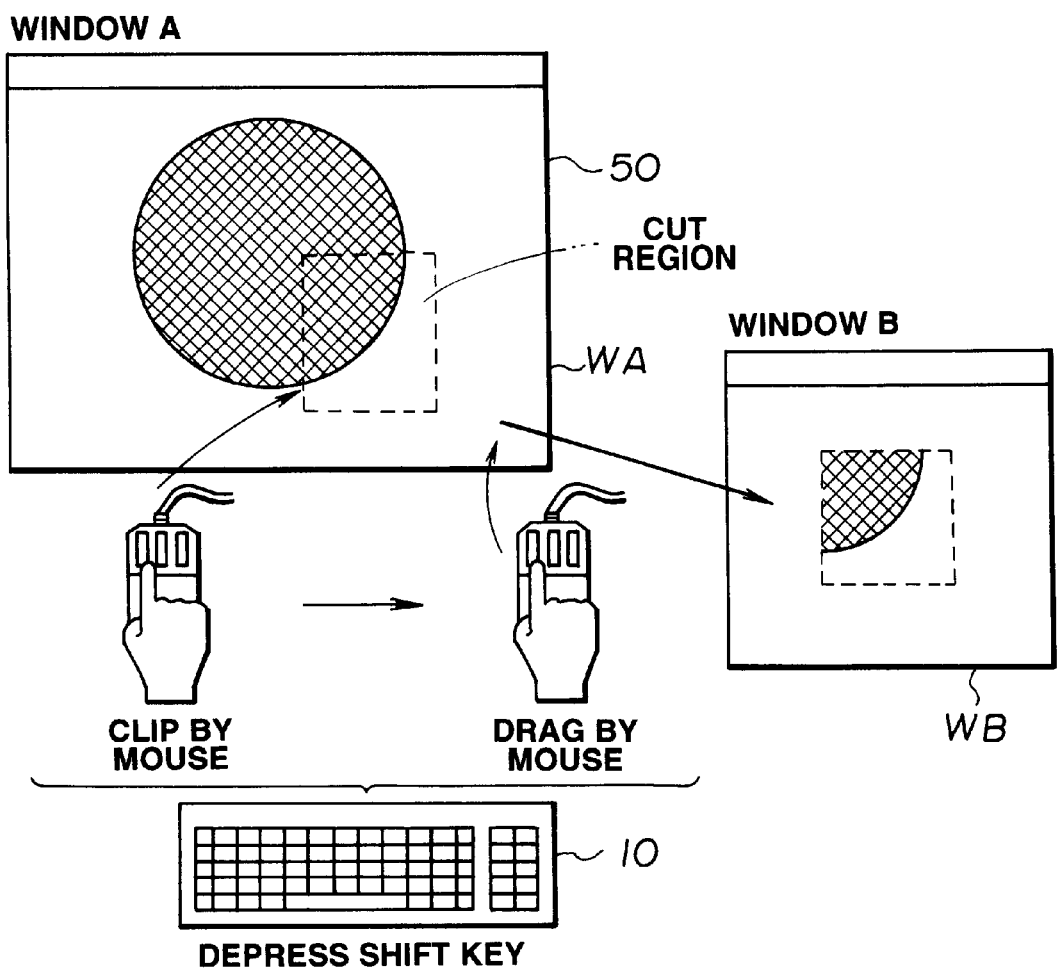
FIG. 9 is a schematic diagram illustrating cut-and-paste processing using a shared clipboard region shown in FIG. 1.

FIG. 9 is a schematic diagram illustrating first cutting processing using the shared clipboard region 38 shown in FIG. 1.

As shown in FIG. 9, when the pointer of the mouse is dragged while depressing, for example, the shift key on the keyboard, serving as the input unit 10, the assigned cut region is stored in the shared clipboard region 38.

(4) Notification of a change in the shared clipboard region 38 to other systems (communication processing with other systems (step S18))

Since the shared clipboard region 38 is possessed by respective systems, it is necessary to notify other systems of a change in the contents of the shared clipboard region 38. When the contents of the shared clipboard region 38 have been changed, the shared clipboard communication unit 40 transmits the contents of the shared clipboard region 38 after the change to the other systems using a predetermined protocol via the communication network 12.

Upon reception of notification from another system that the information of the shared clipboard region 38 has been updated, the shared clipboard communication unit 40 writes the received information in the shared clipboard region 38.

Figure 3:
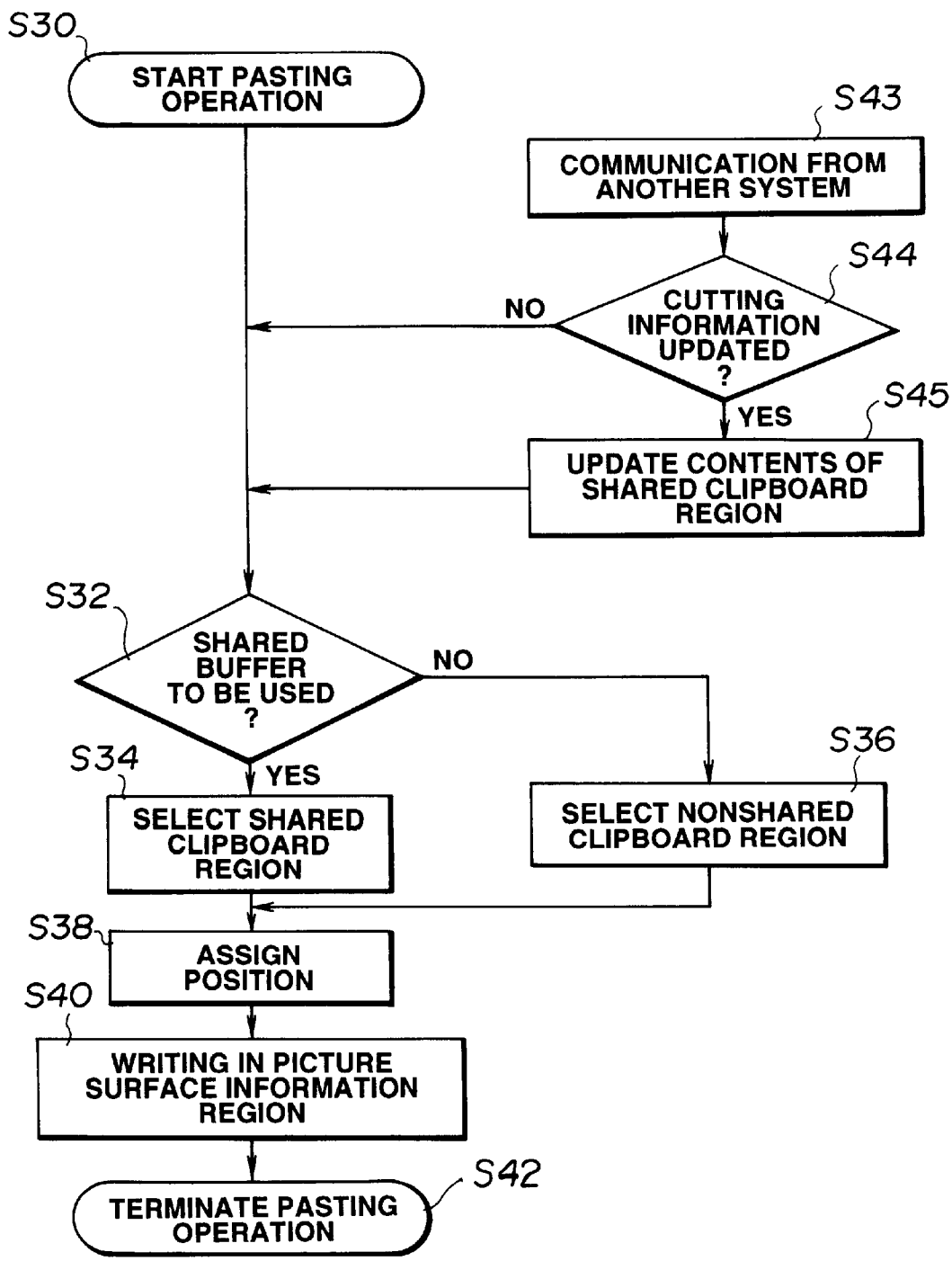
FIG. 3 is a flowchart illustrating a pasting operation in the system of the first embodiment.

FIG. 3 is a flowchart illustrating procedures of a pasting operation performed by the system of the first embodiment. The procedures of the pasting operation will be described with reference to FIGS. 1 and 3.

(1) Selection of data from the nonshared clipboard region 36 (process of determining if the shared buffer must be used (step S32), and process of selecting the nonshared clipboard region 36 (step S36))

In the case of assigning a pasting operation using the nonshared clipboard by button pressing or selection of a menu using the mouse, or by input of a command through the keyboard, when a pasting operation command has been input, the command analysis unit 20 transmits the command to the pasting processing unit 26. The pasting processing unit 26 then selects data from the nonshared clipboard region 36 as an object to be pasted, and raises a flag notifying the assigned object information region 34 of the selection of the data from the nonshared clipboard region 36.

(2) Selection of data from the shared clipboard region 38 (determination if the shared buffer must be used (step S32), and selection of the shared clipboard region 38 (step S34))

In the case of assigning a pasting operation using the shared clipboard by button pressing or selection of a menu by the mouse, or by input of a command through the keyboard, when a pasting operation command has been input from the input unit 10, the command analysis unit 20 transmits the command to the pasting processing unit 26. The pasting processing unit 26 then selects data from the nonshared clipboard region 38 as an object to be pasted, and raises a flag notifying the assigned object information region 34 of the selection of the data from the shared clipboard.

(3) Assignment of a position where the selected object is pasted (process of assigning the position (step S38))

When the position where the object is pasted has been assigned by button pressing using the mouse or position assignment through the keyboard, positional information is written in the assigned object information region 34.

(4) Pasting of the object (process of writing in the picture surface information region 32 (step S40))

The contents of the nonshared clipboard region 36 or the shared clipboard region 38 are written in the assigned position of the picture surface information region 32 based on the flag set in step S34 or S36 and the positional information written in step S38. The written information is displayed on the display unit 50.

In parallel to the cut-and-paste processing in the user's own system, when another system has updated the contents of the shared clipboard, the updated contents are transmitted.

When the communication unit 40 has received the communication from the other system in step S43, it is determined in step S44 if the contents of the shared clipboard region 38 have been updated. If the result of the determination is negative, the process proceeds to step S32. If the result of the determination is affirmative, in step S45, the communication unit 40 updates the contents of the shared clipboard region 38 by writing the received contents therein, and the process proceeds to step S32.

Figure 5A:
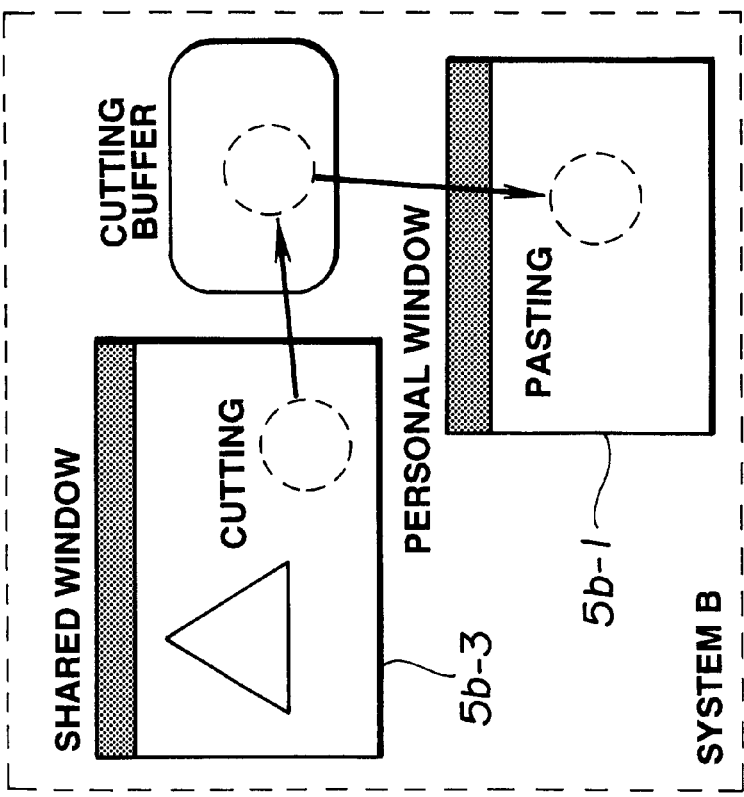
FIGS. 5(a) and 5(b) illustrate a cut-and-paste operation in a conventional approach.
Figure 5B:
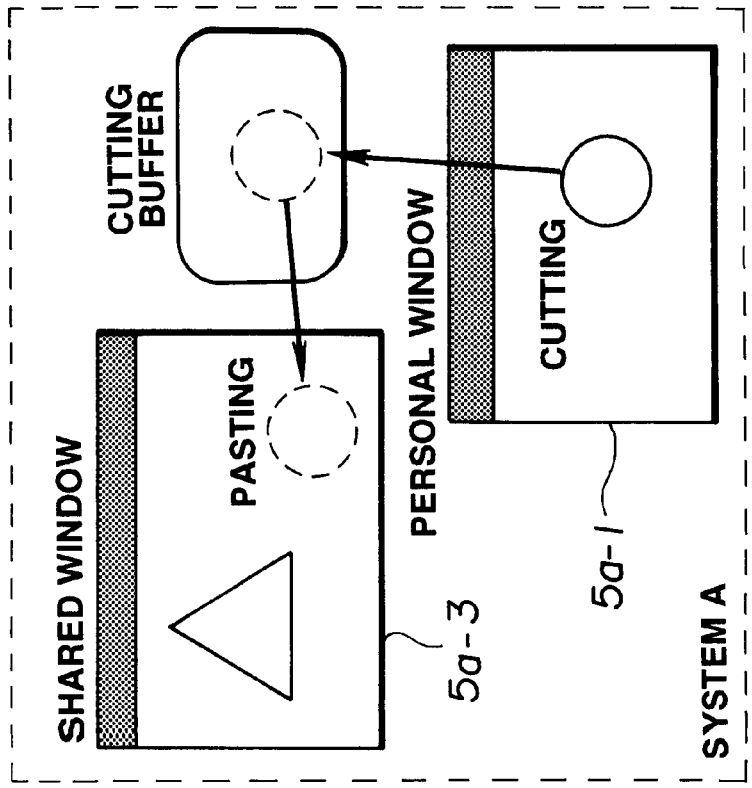
Figure 6:
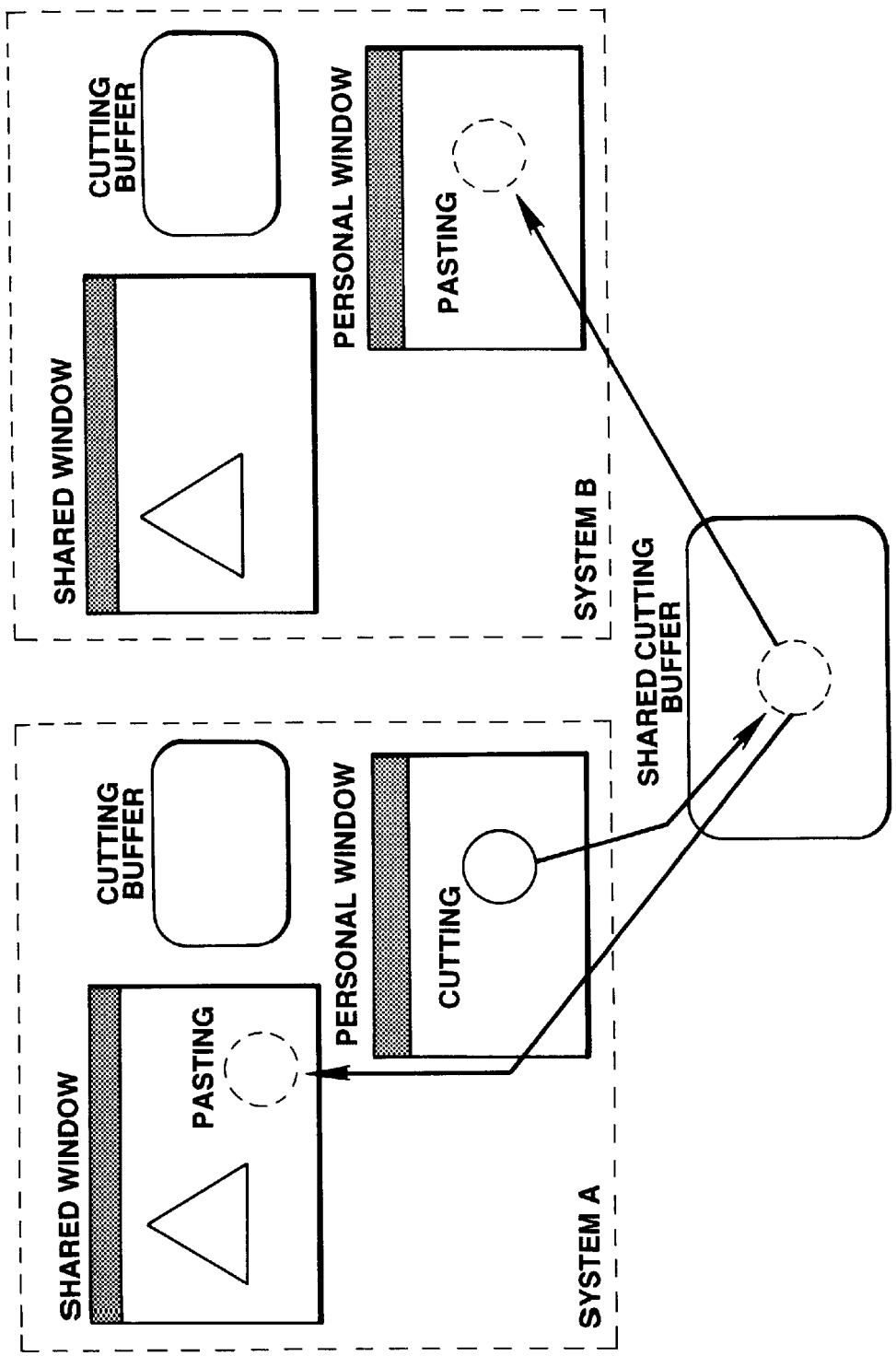
FIG. 6 illustrates a cut-and-paste operation according to the system of the first embodiment.

FIG. 6 illustrates the cut-and-paste operation using the shared clipboard in the first embodiment. As in the case of FIG. 5, an object on the personal window of system A is pasted to the personal window of system B. In system A, the object on the personal window is cut and is then pasted onto the shared window. At that time, a shared cutting buffer which can also be referred to from system B is used as a buffer where the cut data is temporarily stored. System B pastes the contents of the shared cutting buffer onto its personal window. Thus, the object on the personal window of system A can be pasted onto the personal window of system B without being modified.

According to the above-described procedures, a desired portion of data used in another system can be added to a desired position of desired data only by performing a single cut-and-paste operation, as in the case of an ordinary operation. Accordingly, it is only necessary to perform a single cut-and-paste operation, and it is unnecessary to perform an operation of calling a shared window and to display the shared window, so that a necessary display is not concealed by unnecessary data. In addition, data, which is unnecessary for shared data, displayed on the shared window will not remain.

By copying the contents of the shared cutting buffer to a personal cutting buffer in addition to pasting the contents from the shared cutting buffer onto the personal window, the operation can be performed without worrying that the contents of the shared cutting buffer are changed by other systems.

Second Embodiment

Figure 4:
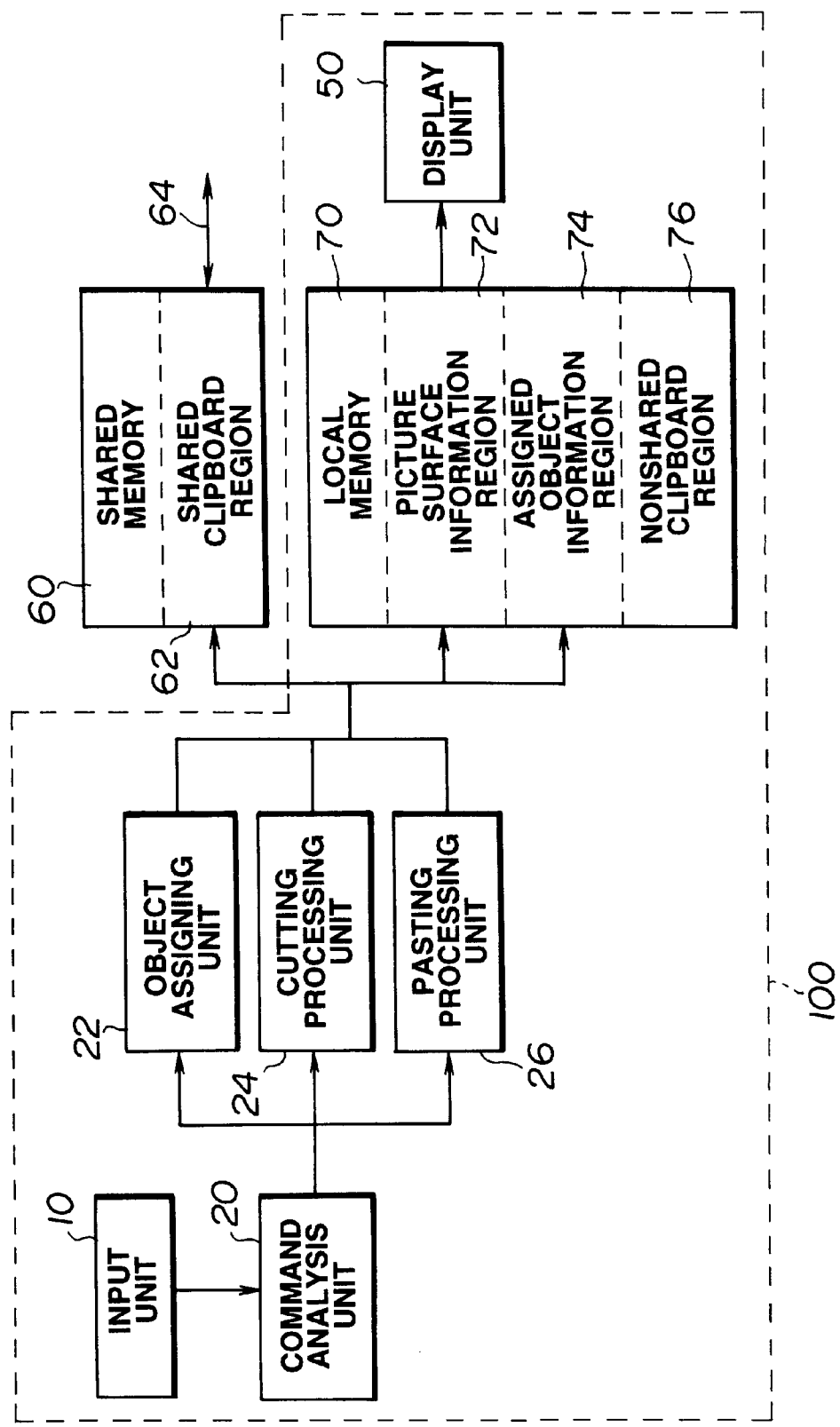
FIG. 4 is a block diagram illustrating the configuration of a data processing system according to a second embodiment of the present invention.

FIG. 4 is a diagram which very well represents characteristics of a system according to a second embodiment of the present invention. In FIG. 4, reference numeral 10 represents an input unit 10 for inputting commands and the like. A command analysis unit 20 analyzes a command and transmits controls of corresponding processing to respective processing units. An object assigning unit 22 assigns an object to be subjected to a cut-and-paste operation. A cutting processing unit 24 performs cutting processing of data. A pasting processing unit 26 performs a pasting processing of data. Reference numeral 60 represents a shared memory. A shared clipboard region 62 in the shared memory 60 stores information relating to a shared clipboard. Reference numeral 70 represents a local memory. A picture surface information region 72 in the local memory 70 stores information output to the picture surface of a display unit 50. An assigned object information region 74 in the local memory 70 stores information relating to the assigned object. A nonshared clipboard region 76 in the local memory 70 stores information relating to a clipboard which is locally used in each system. Since information of the shared clipboard is stored in the shared memory 60, the shared clipboard region 62 can be referred to from other processors via a shared bus. Reference numeral 64 represents reference/writing from other processors. A broken-line frame 100 represents a local system which operates independently.

Figure 8:
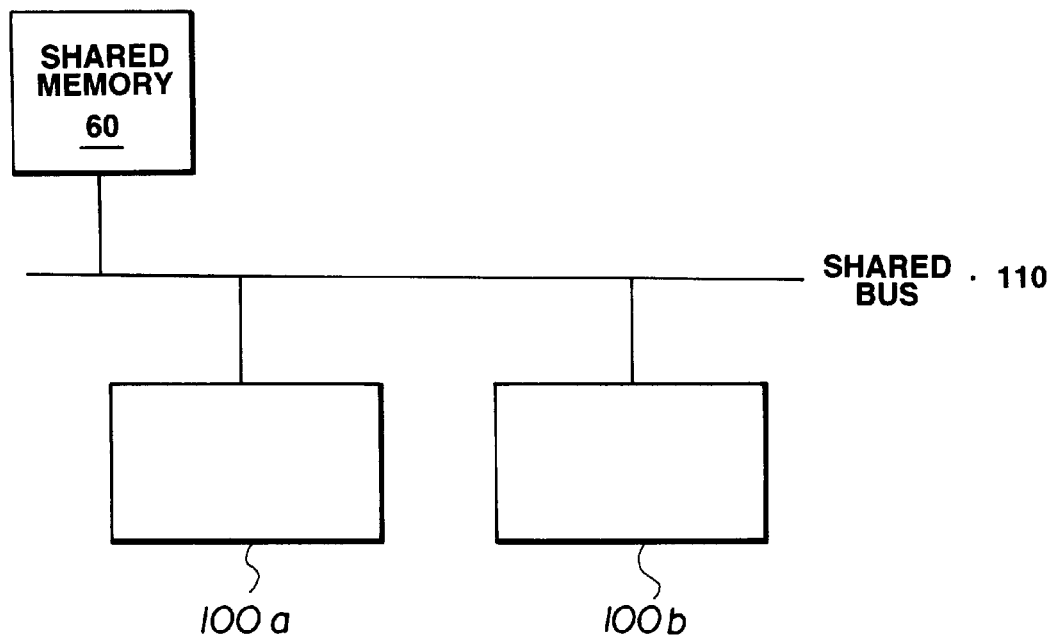
FIG. 8 is a diagram illustrating the configuration of systems in the second embodiment.

FIG. 8 illustrates a system in which local systems 100a and 100b and the shared memory 60 are connected through a shared bus 110.

FIG. 2 is a flowchart illustrating procedures of a cutting operation according to the second embodiment. First, the procedures of the cutting operation will be described with reference to FIGS. 4 and 2.

(1) Assignment of an object to be cut (processing of assigning an object region (step S12))

When an object-assigning command for assigning an object to be cut has been input from the input unit 10 by region assignment using the mouse or position assignment through the keyboard, the command analysis unit 20 transmits positional information of the assigned object to the object assigning unit 22. The object assigning unit 22 then writes information relating to the assigned object in the assigned object information region 74 in the local memory 70.

(2) Writing of the object region in the nonshared clipboard region 76 (processing of determining if a shared buffer must be used (step S14), and writing processing in the nonshared clipboard region 76 (step S20))

In the case of assigning a cutting operation using the nonshared clipboard by clipping or selection of a menu by the mouse, or by input of a command through the keyboard, when a cutting operation command has been input, the command analysis unit 20 causes the cutting processing unit 24 to perform control. The cutting processing unit 24 then extracts the assigned object from the picture surface information region 72 based on the information stored in the assigned object information region 74, and writes the extracted data in the nonshared clipboard region 76.

(3) Writing of the object in the shared clipboard region 62 (processing of determining if the shared buffer must be used (step S14), and writing processing in the shared clipboard region 62 (step S16))

In the case of assigning a cutting operation using the shared clipboard 62 by clipping or selection of a menu by the mouse, or by input of a command through the keyboard, when a cutting operation command has been input, the command analysis unit 20 causes the cutting processing unit 24 to perform control. The cutting processing unit 24 then extracts the assigned object from the picture surface information region 72 based on the information stored in the assigned object information region 74, and writes the extracted data in the shared clipboard region 62 in the shared memory 60.

The operation of writing the object in the shared clipboard region 62 is basically the same as the operation of writing the object in the nonshared clipboard region 76, but care must be taken so as not to make the operation of writing the object in the shared clipboard region 62 more complicated than the operation of writing the object in the nonshared clipboard region 76. For example, in a clipping operation using the mouse, the object region to be cut is written in the nonshared clipboard region 76 when a clipping operation is performed without doing any additional operation, and is written in the shared clipboard region 62 when a clipping operation is performed while depressing the control key.

(4) Notification of a change in the shared clipboard region 62 to other systems (communication processing with other systems (step S18))

Since the shared clipboard region 62 is present in the shared memory 60, a change in the contents causes notification of the change to other processors.

FIG. 3 is a flowchart illustrating procedures of a pasting operation performed by the system of the second embodiment. The procedures of the pasting operation will be described with reference to FIGS. 4 and 3.

(1) Selection of data from the nonshared clipboard region 76 (process of determining if the shared buffer must be used (step S32), and process of selecting the nonshared clipboard region 76 (step S36))

In the case of assigning a pasting operation using the nonshared clipboard by button pressing or selection of a menu using the mouse, or by input of a command through the keyboard, when a pasting operation command has been input, the command analysis unit 20 transmits the command to the pasting processing unit 26. The pasting processing unit 26 then selects data from the nonshared clipboard region 76 as an object to be pasted, and raises a flag notifying the assigned object information region 74 of the selection of the data from the nonshared clipboard region 76.

(2) Selection of data from the shared clipboard region 64 (determination if the shared buffer must be used (step S32), and selection of the shared clipboard region 64 (step S34))

In the case of assigning a pasting operation using the shared clipboard by button pressing or selection of a menu by the mouse, or by input of a command through the keyboard, when a pasting operation command has been input, the command analysis unit 20 transmits the command to the pasting processing unit 26. The pasting processing unit 26 then selects data from the nonshared clipboard region 62 as an object to be pasted, and raises a flag notifying the assigned object information region 74 of the selection of the data from the shared clipboard.

(3) Assignment of a position where the object is to be pasted (process of assigning the position (step S38))

When the position where the object is pasted has been assigned by button pressing using the mouse or position assignment through the keyboard, positional information is written in the assigned object information region 74.

(4) Pasting of the object (process of writing in the picture surface information region 72)

The contents of the nonshared clipboard region 76 or the shared clipboard region 62 are written in the assigned position of the picture surface information region 72 based on the flag set in step S34 or S36 and the positional information written in step S38.

By performing a cut-and-paste processing between data held by different systems according to the above-described procedures, the operation can be performed in the same manner as in the case of an ordinary cut-and-paste operation, and therefore it is unnecessary to perform the operation via additional processes and data.

Although a description has been provided illustrating a cut-and-paste operation in the first and second embodiments, any other operation, such as a copying operation or the like, of moving data between a plurality of different systems, which is similar to the cut-and-paste operation, can also be performed in the same manner as described above. Also in processing of moving or copying data held by respective users in a single system or in a system, such as a multiuser system, in which processes for a plurality of users can be performed independently, the moving/copying processing can be performed by providing a clipboard in a shared memory and performing the processing via the clipboard, as in the above-described embodiments. In such cases, it is unnecessary to perform the processing via communication and that the shared memory is physically independent. Each user is logically and virtually independent, and a memory allocated to each user can be considered as a nonshared local memory. Hence, the processing can be performed by the same configuration and processing procedures as in the above-described embodiments.

The present invention may be applied to a system comprising a plurality of apparatuses, or to an apparatus comprising a single unit. The present invention may, of course, be applied to a case in which the object of the invention is achieved by supplying a system or an apparatus with programs.

As described above, in the data processing method and system of the present invention, procedures in an editing operation are simplified by providing a buffer which can be referred to from a plurality of systems.

As described above:

(1) by providing a buffer in a shared clipboard which can be referred to from a plurality of systems, operation steps in an editing operation can be reduced; and (2) By providing the configuration of the shared clipboard of the present invention, it is possible to easily provide user interface in which the use of the shared clipboard and the use of the unshared clipboard can be switched by performing slightly different operations.

Third Embodiment

The configuration of a data processing system according to a third embodiment of the present invention is the same as that shown in FIG. 1. Hence, a description of the configuration will be omitted.

Figure 10A:
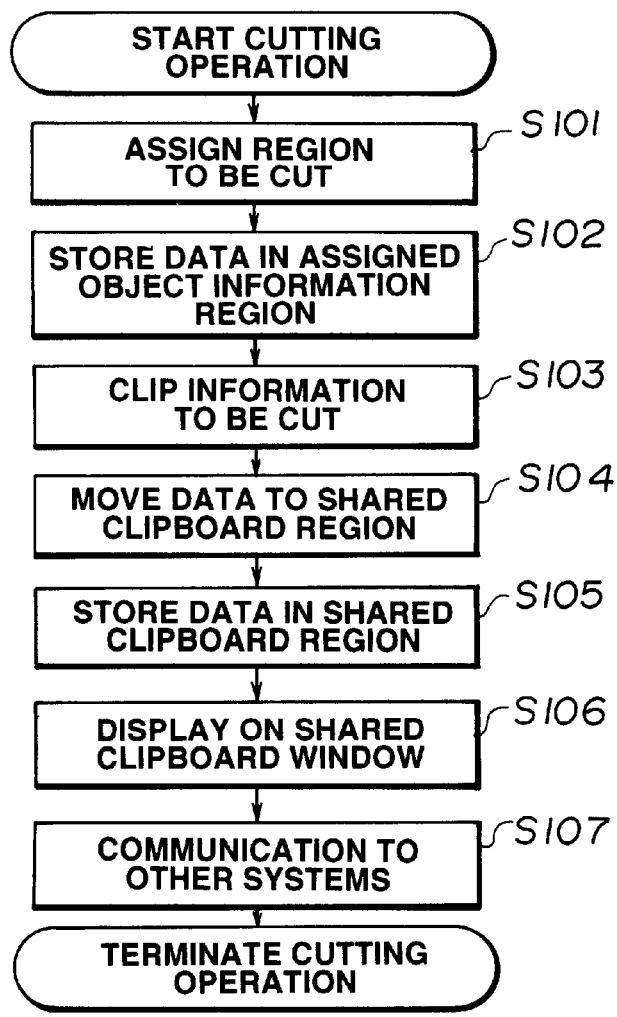
FIGS. 10(a) and 10(b) are flowcharts illustrating a data processing method of a data processing system according to a third embodiment of the present invention.
Figure 10B:
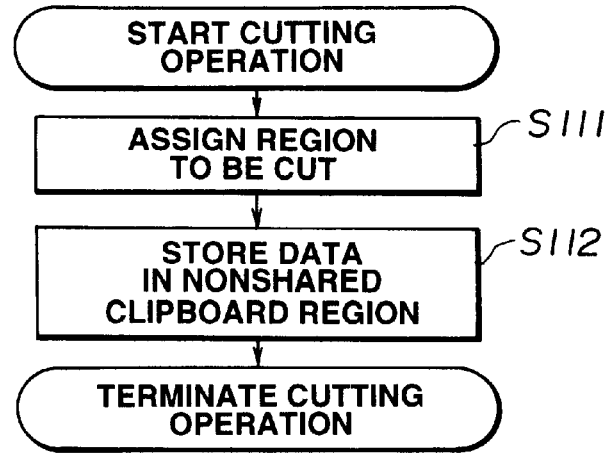

FIGS. 10(a) and 10(b) are flowcharts illustrating the processing of the data processing system of the third embodiment: FIG. 10(a) corresponds to cutting operation procedures when using a shared clipboard; and FIG. 10(b) corresponds to cutting operation procedures when not using the shared clipboard.

When using the shared clipboard, in step S101, a region to be cut is assigned by dragging the pointer of the mouse or the like, serving as the input unit 10, or by position assignment by an input operation through the keyboard. In the third embodiment, upon reception of the assignment, the command analysis unit 20 transmits a cut region assigning processing command to the cutting processing unit 24. Then, in step S102, data is stored in the assigned object information region 34. Upon the assignment of the region to be cut, the cutting processing unit 24 stores data within the region in the assigned object information region 34. In step S103, information to be cut is clipped. In the third embodiment, when using the shared clipboard, the region to be cut assigned in step S101 is clipped by the mouse or the like, serving as the input unit 10, and is then dragged to a shared clipboard window CWB using the mouse or the like, serving as the input unit 10.

Figure 11:
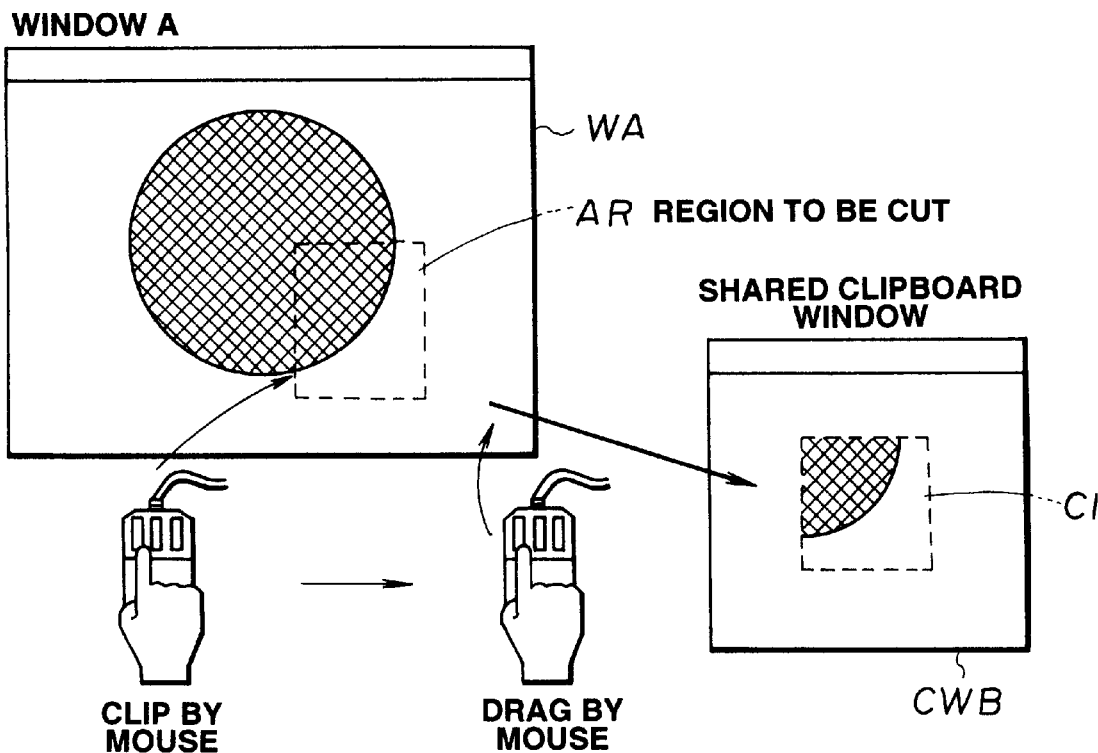
FIG. 11 is a schematic diagram illustrating a cut-and-paste processing using the shared clipboard region shown in FIG. 1.

FIG. 11 is a schematic diagram illustrating cut-and-paste processing in which the shared clipboard region 38 shown in FIG. 1 is used.

As shown in FIG. 11, upon starting the shared clipboard CWB, it appears. In FIG. 11, a part of the object on a window WA is assigned as a region to be cut AR, and cut information CI of the region is moved to the shared clipboard window CWB.

More specifically, when an operation to move the data to the shared clipboard has been performed in step S104, the cutting processing unit 24 stores the contents of the assigned object information region 34 in the shared clipboard region 38 (step S105).

Then, in step S106, the cutting processing unit 24 updates the shared clipboard region 38. At the same time, the contents of the display on the shared clipboard window CWB is updated.

On the other hand, the communication unit 40 monitors the shared clipboard region 38 and transmits the contents of the shared clipboard region 38 to other systems when the contents have been updated (step S107), and the process is terminated.

When not using the shared clipboard, a region to be cut is assigned by dragging the pointer of the mouse or the like, serving as the input unit 10, or by position assignment by an input operation through the keyboard (step S111). In the third embodiment, upon reception of the assignment, the command analysis unit 20 transmits a cut region assigning processing command to the cutting processing unit 24. Then, the data is stored in the nonshared clipboard region 36 (step S112), and the process is terminated.

Figure 12A:
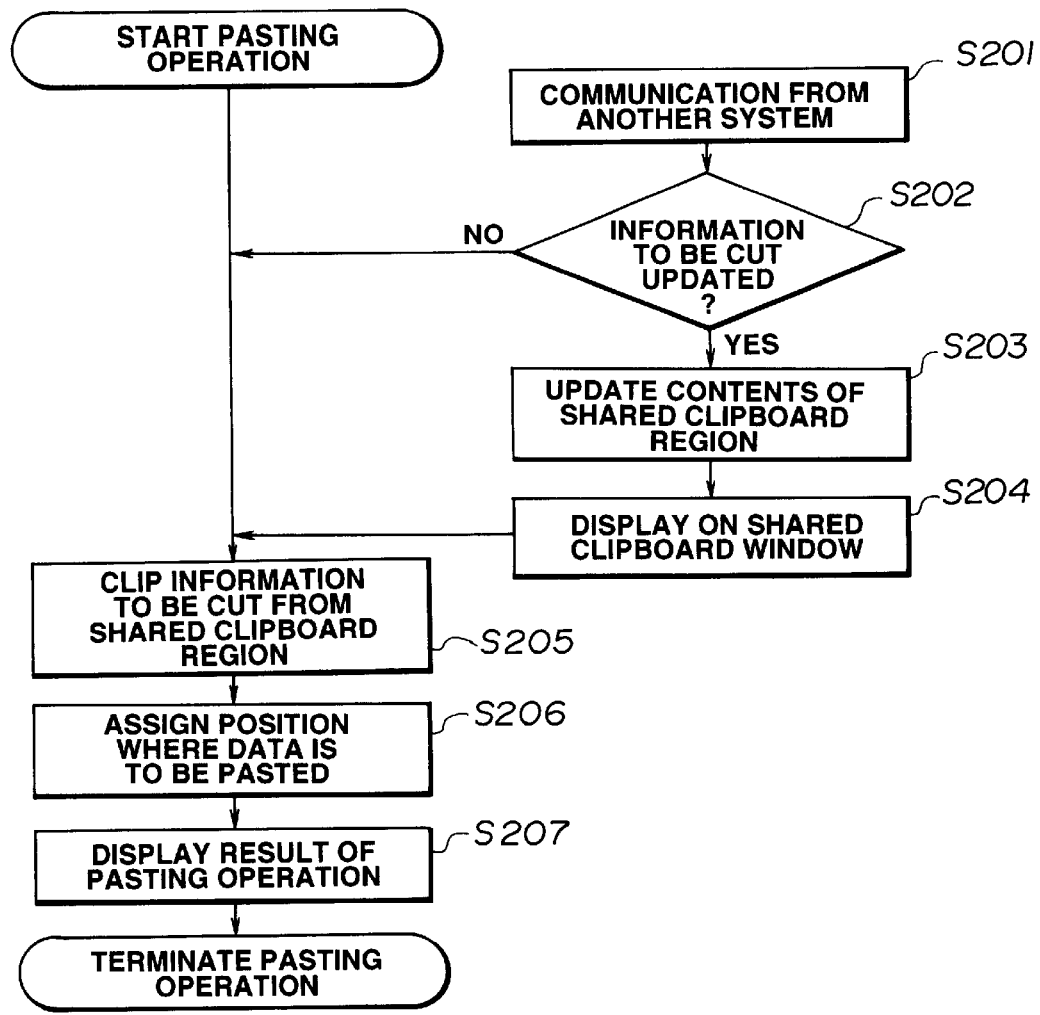
FIGS. 12(a) and 12(b) are flowcharts illustrating a data processing method of the data processing system of the third embodiment.
Figure 12B:
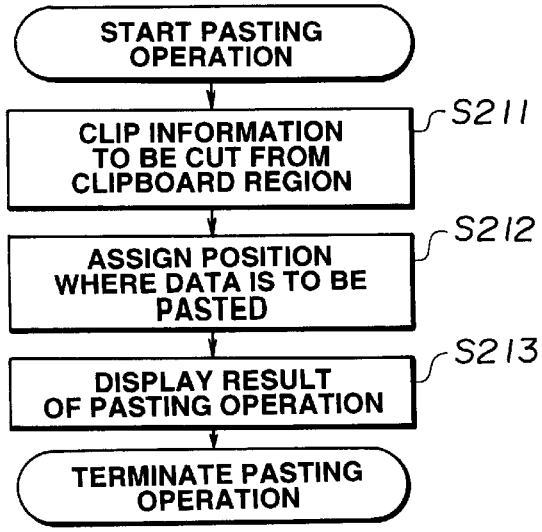

FIGS. 12(a) and 12(b) are flowcharts illustrating pasting operation procedures of the data processing system of the third embodiment: FIG. 12(a) corresponds to pasting operation procedures when using the shared clipboard; and FIG. 12(b) corresponds to pasting operation procedures when not using the shared clipboard. When a pasting operation has been instructed, the command analysis unit 20 transmits the instruction to the pasting processing unit 26.

In the pasting operation of the third embodiment, either a buffer in the shared clipboard region 38 or a buffer in the nonshared clipboard region 36 locally held by the user's system is used. Accordingly, when not using the shared clipboard, information to be cut is clipped from the nonshared clipboard region 36 (step S211).

In the third embodiment, when assigning locally clipped information as information to be pasted, the assignment is performed by an ordinarily used approach, such as an assigning operation of a menu by the mouse or the like, serving as the input unit 10. Upon the assignment, the contour of the clipped information appears on the picture surface of the display 50 in a state of being clipped by the mouse or the like, serving as the input unit 10. The pasting processing unit 26 provides the contour of the cut information based on the contents of the nonshared clipboard region 36 or the shared clipboard region 38.

Thereafter, the position where the data is to be pasted is assigned (step S212), the result of the pasting operation is displayed (step S213), and the process is terminated.

When using the shared clipboard, if another system updates the contents of the shared clipboard in parallel to the cut-and-paste processing of the user's own system, the contents are transmitted.

When the communication unit 40 has received the updating of the contents of the shared clipboard from the other system (step S201), it is determined if the contents of the shared clipboard region 38 have been updated (step S202). If the result of the determination is negative, the process proceeds to step S205. If the result of the determination is affirmative, the communication unit 40 updates the contents of the shared clipboard region 38 by writing the received contents therein (step S203). Thereafter, the information to be cut clipped in step S202 or S203 is dragged using the mouse or the like, serving as the input unit 10, and the position where the data is to be pasted is then determined. After the position has been determined, the pasting processing unit 26 places the cut information on the display memory by clicking the mouse or the like, serving as the input unit 10.

Thus, the result of the pasting operation is displayed on the display unit 50 (step S204). That is, upon the updating of the shared clipboard region 38, the contents of the shared clipboard window CWB are updated.

Thereafter, the information to be cut is clipped from the shared clipboard region 38 (step S205). In the third embodiment, when performing a pasting operation using the shared clipboard region 38, the object on the shared clipboard window CWB is clipped by the mouse. Then, the position where the data is to be pasted is assigned (step S206), the result of the pasting operation is displayed (step S207), and the process is terminated.

Figure 13:
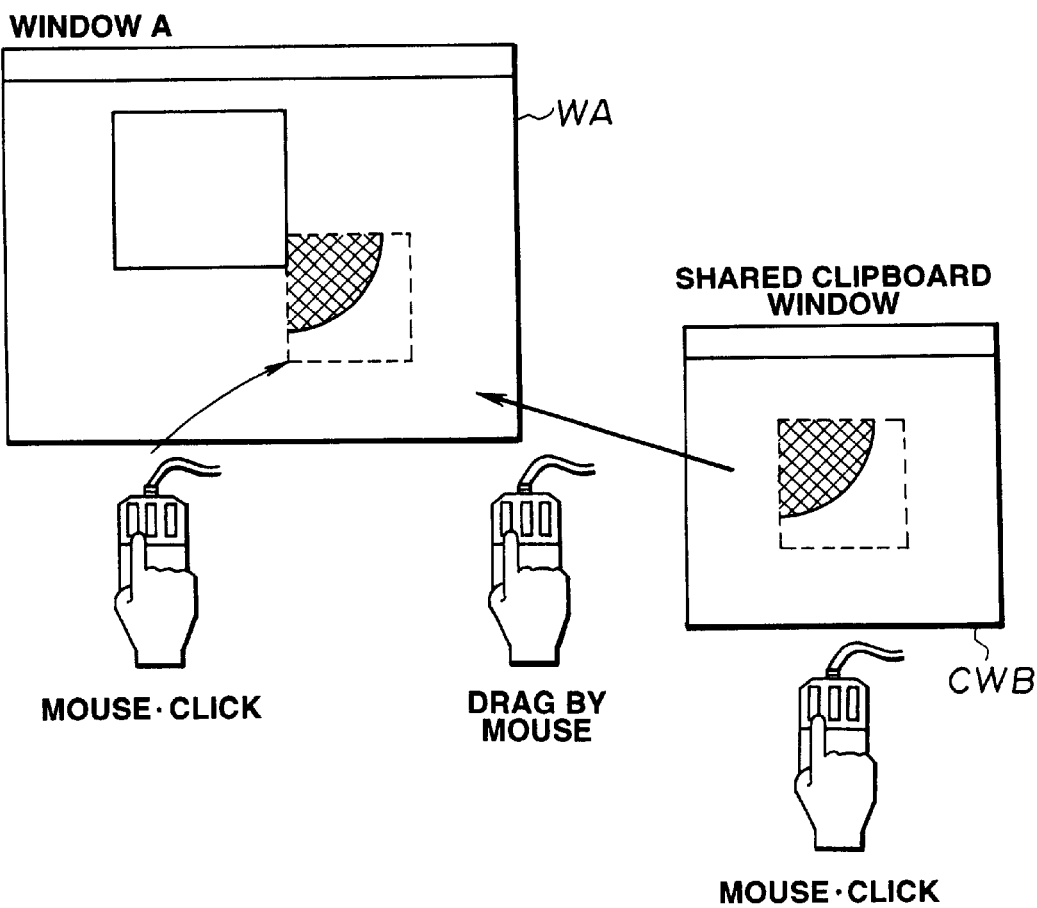
FIG. 13 is a schematic diagram illustrating cut-and-paste processing using the shared cipboard region shown in FIG. 1.

FIG. 13 is a schematic diagram illustrating a cut-and-paste operation using the shared clipboard region 38 shown in FIG. 1.

As shown in FIG. 13, a pasting operation is performed by clipping the object on the shared clipboard window CWB by the mouse, dragging the clipped object to the position where the object is to be pasted (in the direction of the thick arrow), and then clicking the mouse.

The present invention may be applied to a system comprising a plurality of apparatuses, or to an apparatus comprising a single unit. The present invention may, of course, be also applied when the object of the invention is achieved by supplying a system or an apparatus with programs.

The present invention has features in that, for example, information assigned to be cut or pasted can be efficiently registered or read as clipped information locally held by a system or as shared clipped information shared by systems with a small number of operation instructions.

The individual components designated by blocks in the drawings are all well known in the data processing method and system arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data processing method in which data from each of a plurality of systems is shared by a shared memory, such that shared memory contains data from several of said plurality of systems and such that said data is available to each of said systems, each of said systems also including a local memory, said method comprising the steps of:

selecting a desired data region in the local memory of a desired one of said systems;

assigning a memory storage location within said shared memory to store data from the selected data region of the local memory of said desired one of said systems;

storing the data from the selected data region of said local memory of said desired one of said systems in the assigned memory storage location in said shared memory, whereby the data from the selected region is present in the same assigned memory location of said shared memory which is shared by each of said systems; and transferring the data contained in the assigned storage location within said shared memory to the local memory of another one of said systems.

2. A data processing method according to claim 1, wherein the shared memory is shared by updating to the same contents in the respective systems by communication.

3. A data processing method according to claim 1, wherein the shared memory is shared by being connected to a bus shared by the respective systems.

4. A data processing method in which data from each of a plurality of systems is shared by a shared memory, such that said shared memory contains data from several of said plurality of systems and such that said data is available to each of said systems, each of said systems also including a local memory, said method comprising the steps of:

selecting from data displayed on a picture surface, a corresponding region in the local memory of one of said plurality of systems;

assigning a memory storage location within said shared memory to store data from the selected data region of the local memory of said desired one of said systems;

storing data from the corresponding region selected in said region selecting step in an assigned location within the shared memory, whereby the data from the selected region is present in the same assigned memory location of said shared memory which is shared by each of said systems; and transferring data from said assigned location in said shared memory to the local memory of another one of said plurality of systems.

5. A data processing method for a plurality of data processing systems, each of which includes first storage means for storing clipped information, locally held by each respective system, to be cut from a window displayed on a picture surface of a display means, and each of which further includes second storage means for storing clipped information which is shared by each of the systems, to be cut from the window displayed on the picture surface of the display means, said method comprising the steps of:

assigning a region of information to be cut from the window of one of said systems;

instructing a cutting operation of information to be cut from said window as shared clipped information;

determining the state of the cutting instruction in said instructing step; and storing information from the assigned region in a predetermined location within the second storage means as shared clipped-information which is present in the same predetermined location in the second storage means of each of said systems, based on the result of the determination in the determining step.

6. A data processing method for a plurality of data processing systems each of which includes a first storage means for storing clipped information, locally held by each respective system, to be cut from a window displayed on a picture surface of a display means, and each of which further includes second storage means for storing shared clipped information which is shared by the systems, to be cut from the window displayed on the picture surface of the display means, said method comprising the steps of:

assigning a position where data is to be pasted on a window of one of said systems;

instructing the pasting of shared clipped information stored in a predetermined location within the second storage means of said one of said systems, said predetermined location being the same location in the second storage means of each of said systems;

determining the state of the pasting instruction by said instructing step; and selecting and pasting the shared clipped information from said predetermined location of the second storage means of said one system to the position within the window assigned by the assigning step based on the result of the determination in the determining step.

7. A data processing method for a plurality of data processing systems each of which includes first storage means for storing clipped information, locally held by each respective system, to be cut from a window displayed on a picture surface of a display means, and each of which further includes second storage means for storing shared clipped information which is shared by the systems, to be cut from the window displayed on the picture surface of the display means, said method comprising the steps of:

assigning a region of information to be cut from a window of one of said systems;

storing the information from the assigned region in a predetermined location within a shared storage means as clipped information said predetermined location in said shared storage means being shared by each of said systems;

instructing to move the stored information to a shared clipped window in another of said systems; and storing the information stored in the predetermined location in said shared storage means as clipped information in said moving instructing step in a storage means of said another system as shared clipped information.

8. A data processing method for a plurality of data processing systems each of which includes first storage means for storing clipped information, locally held by each respective system, to be cut from a window displayed on a picture surface of a display means, and each of which further includes second storage means for storing shared clipped information which is shared by the systems, to be cut from the window displayed on the picture surface of the display means, said method comprising the steps of:

assigning a position of information where data is to be pasted on the window of one of said systems;

moving the information to be pasted on said window of one of said systems from a shared clipped window of another one of said systems to a predetermined location within the second storage means of said another one of said systems, said predetermined location being the same in the second storage means of each of said systems; and pasting the shared clipped information stored in said predetermined location within the second storage means to the position in the window of the display means of said one system which was assigned in said assigning step.

9. A data processing system in which data is shared by a shared memory in each of a plurality of data processing apparatuses, each data processing apparatus also including a non-shared local memory, said system comprising:

region selection means for selecting a desired data region in one of the plurality of data processing apparatuses;

storage location assigning means for assigning a location in said shared memory to store the selected data region;

shared storage means shared by each of said apparatuses for storing data of the selected region in the storage location assigned by said storage location assigning means, said location being within said shared memory storage means and said location also being shared by each of said apparatuses;

connected data location assigning means for assigning a location in another one of said data processing apparatuses for data stored in said assigned location within said shared storage means to be connected to other data in said another one of said data processing apparatuses; and connection means for connecting the data of the selected region which is stored in the assigned location of said shared storage means to said other data in said location in said another one of said data processing apparatuses based on the assignment by said connected data assigning means.

10. A data processing system according to claim 9, wherein the shared memory is shared by updating to the same contents in the respective apparatuses by communication.

11. A data processing system according to claim 9, wherein the shared memory is shared by being connected to a bus shared by the respective apparatuses.

12. A data processing system in which data is shared by a shared memory in each of a plurality of apparatuses, each apparatus including a non-shared local memory, said system comprising:

region assigning means for assigning a desired region from data displayed on a picture surface of one apparatus;

storage means for storing data from the region assigned by said region assigning means in a predetermined location within a shared memory, said shared memory and said predetermined location being shared by each of said plurality of apparatuses;

position assigning means for assigning a position for the data to be displayed on a picture surface in another apparatus; and copying means for assigning the shared memory and for copying the data stored by said storage means from the predetermined location in the shared memory to the position assigned by said position assigning means.

13. A data processing system in which a plurality of apparatuses perform operations by sharing data, said system comprising:

a position buffer in at least one of said apparatuses for storing positional information relating to a portion to be cut;

an internal buffer within each apparatus for storing cut information;

a shared buffer which is shared by said apparatus for storing, in a predetermined location therein, cut information so that it is shared by each of said apparatuses;

means for specifying the cut portion and storing the positional information thereof in a predetermined location in said position buffer;

means for connecting said shared buffer to each of said apparatuses;

switching means for switching said shared buffer between said internal buffers of said one and another apparatus;

means for storing the positional data stored in said position buffer by selecting said predetermined location within said shared buffer switched by said switching means; and reading means for selecting the shared buffer switched by said switching means and reading data of the contents of said predetermined location within said shared buffer.

14. A data processing system including first storage means for storing clipped information, locally held by one apparatus in said system, to be cut on a window displayed on a picture surface of display means of said one apparatus, and shared storage means for storing shared clipped information, shared with other systems, to be cut from the window displayed on the picture surface of said display means, said system comprising:

assigning means for assigning a region of information to be cut from a window of one of said apparatuses;

instruction means for instructing the cutting of information from said assigned region of said window to be cut as shared clipped information;

determination means for determining the state of the cutting instruction by said instruction means; and cutting control means for storing the information assigned to be cut by said assigning means in a predetermined location in the shared storage means as shared clipped information, based on the result of the determination by said determination means, said predetermined location being shared by each of said apparatuses whereby information which was clipped from said one apparatus is readily available from said predetermined location in said shared storage means.

15. A data processing system including first storage means for storing clipped information, locally held by one apparatus of said system, to be cut from a window displayed on a picture surface of display means of said one apparatus, and shared storage means for storing shared clipped information, shared by systems, to be cut from the window displayed on the picture surface of said display means, said system comprising:

assigning means for assigning the position of information to be pasted on a window of one of said apparatuses;

instruction means for instructing information from said assigned position to be stored in a predetermined location within the shared storage means as shared clipped information to be pasted;

determination means for determining the state of the storing instruction by said instruction means; and pasting control means for pasting the shared clipped information from the predetermined location in said shared storage means to an assigned position within a window of another system based on the result of the determination by said determination means.

16. A data processing system including first storage means for storing clipped information, locally held by one apparatus in said system, to be cut from a window displayed on a picture surface of a display means of said one apparatus, and shared storage means for storing shared clipped information, shared with other systems, to be cut from the window displayed on the picture surface of said display means, said system comprising:

assigning means for assigning a region of information to be cut from a window of one of said apparatuses;

cutting control means for storing the information of the region assigned by said assigning means in a predetermined location in the shared storage means as clipped information; and determination means for determining if the information to be cut from the window of said one system must be cut as shared clipped information, wherein said cutting control means stores again the clipped information stored in the first storage means in the predetermined location in the shared storage means as shared clipped information based on the result of the determination of said determination means, said predetermined location being shared by each of said apparatuses whereby information which was clipped from said one apparatus is readily available from said predetermined location in said shared storage means.

17. A data processing system including first storage means for storing clipped information, locally held by an apparatus in said a system, to be cut from a window displayed on a picture surface of a display means, and shared storage means for storing shared clipped information, shared with other apparatuses in said system, to be cut from the window displayed on the picture surface of the display means, said system comprising:

assigning means for assigning a position of information to be pasted on a window of one of said apparatuses;

determination means for determining that the information to be pasted on the window must be pasted as shared clipped information; and pasting control means for reading shared clipped information which is stored in a predetermined location within the shared storage means to the position in the window of display means of another system where the information is assigned to be pasted, based on the result of the determination of said determination means;

determining means for determining the state of the pasting instruction by said instructing step; and selecting and pasting means for selecting and pasting one of the clipped information and the shared clipped information from the first storage means and the predetermined location within the shared storage means, respectively, to the position within the window assigned by the assigning step based on the result of the determination in the determining step, said shared storage means, including said predetermined location within said shared storage means, being shared by each of said apparatuses.

18. A computer data storage medium containing a program for carrying out the method of any of claims 1, 4, 5, 6, 7 or 8.

19. A computer data storage apparatus containing a program for carrying out the operation of the apparatus of any of claims 9, 12, 13, 14, 15, 16 or 17.

* * * * *

UNITED STATES PATENT AND TRADEMARK OFFICE
CERTIFICATE OF CORRECTION

PATENT NO. : 5,926,633

DATED : July 20, 1999

INVENTOR(S) : TSUNEYOSHI TAKAGI ET AL.

It is certified that error appears in the above-identified patent and that said Letters Patent is hereby corrected as shown below:

ON TITLE PAGE AT [30], FOREIGN APPLICATION PRIORITY DATA

"Mar. 3, 1994" should read --Mar 4. 1994--.

Drawing:
SHEET 1

FIGURE 1, "NONSHARED" should read --SHARED--.

COLUMN 5

Line 55, "cipboard" should read --clipboard--.

COLUMN 7

Line 35, "Thereupon" should read --Thereupon,--.

COLUMN 13

Line 26, "cut clipped" should read --clipped--.

COLUMN 15

Line 11, "clipped-information" should read
      --clipped information--;

Line 50, "information" should read --information,--.

UNITED STATES PATENT AND TRADEMARK OFFICE
CERTIFICATE OF CORRECTION

PATENT NO.  : 5,926,633

DATED       : July 20, 1999

INVENTOR(S) : TSUNEYOSHI TAKAGI ET AL.

It is certified that error appears in the above-identified patent and that said Letters Patent is hereby corrected as shown below:

<u>COLUMN 18</u>

Line 31, "said a system" should read --said system--.

Signed and Sealed this

Seventh Day of March, 2000

Attest:

Attesting Officer

Q. TODD DICKINSON

Commissioner of Patents and Trademarks